United States Patent
Wang et al.

(10) Patent No.: US 12,273,295 B2
(45) Date of Patent: Apr. 8, 2025

(54) TWO-STAGE DESIGN FOR NEW RADIO (NR) SIDELINK CONTROL INFORMATION (SCI)

(71) Applicant: MEDIATEK INC., Hsinchu (TW)

(72) Inventors: Chien-Yi Wang, Hsinchu (TW); Ju-Ya Chen, Hsinchu (TW); Tao Chen, Beijing (CN)

(73) Assignee: MEDIATEK INC., Hsinchu (TW)

( * ) Notice: Subject to any disclaimer, the term of this patent is extended or adjusted under 35 U.S.C. 154(b) by 704 days.

(21) Appl. No.: 17/427,174

(22) PCT Filed: Sep. 25, 2019

(86) PCT No.: PCT/CN2019/107658
§ 371 (c)(1),
(2) Date: Jul. 30, 2021

(87) PCT Pub. No.: WO2020/063611
PCT Pub. Date: Apr. 2, 2020

(65) Prior Publication Data
US 2022/0353846 A1    Nov. 3, 2022

Related U.S. Application Data

(60) Provisional application No. 62/738,017, filed on Sep. 28, 2018.

(51) Int. Cl.
*H04W 72/0446* (2023.01)
*H04L 1/00* (2006.01)
(Continued)

(52) U.S. Cl.
CPC .......... *H04L 5/0055* (2013.01); *H04L 1/0038* (2013.01); *H04W 4/40* (2018.02);
(Continued)

(58) Field of Classification Search
None
See application file for complete search history.

(56) References Cited

U.S. PATENT DOCUMENTS

2016/0295624 A1    10/2016 Novlan et al.
2017/0048905 A1    2/2017 Yun et al.
(Continued)

OTHER PUBLICATIONS

MediaTek Inc., On 2-stage Downlink Control Information for NR, 3GPP TSG RAN WG1 Meeting #87 Reno, USA, Nov. 14-18, 2016, R1-1612121, (Year: 2016).*

(Continued)

*Primary Examiner* — German Viana Di Prisco
(74) *Attorney, Agent, or Firm* — McClure, Qualey & Rodack, LLP

(57) ABSTRACT

A receive (Rx) UE performs blind detection to decode a first-stage Sidelink Control Information (SCI) in a received signal. The first-stage SCI contains control information for the Rx UE to locate time-and-frequency resources used by a transmit (Tx) UE. The time-and-frequency resources are used to transmit the first-stage SCI and a second-stage SCI via a Physical Sidelink Control Channel (PSCCH) and to transmit data via a Physical Sidelink Shared Channel (PSSCH) associated with the PSCCH. The Rx UE locates the second-stage SCI in the time-and-frequency resources based on the first-stage SCI. The second-stage SCI contains additional control information from the Tx UE to the Rx UE for the sidelink V2X communication. The Rx UE decodes the second-stage SCI using at least in part an identifier which identifies the Rx UE as a destination of the received signal.

20 Claims, 9 Drawing Sheets

(51) Int. Cl.
  *H04L 5/00*     (2006.01)
  *H04W 4/40*     (2018.01)
  *H04W 28/26*    (2009.01)
  *H04W 72/02*    (2009.01)
  *H04W 72/0453*  (2023.01)
  *H04W 72/20*    (2023.01)

(52) U.S. Cl.
  CPC .......... *H04W 28/26* (2013.01); *H04W 72/02* (2013.01); *H04W 72/0446* (2013.01); *H04W 72/0453* (2013.01); *H04W 72/20* (2023.01)

(56) References Cited

U.S. PATENT DOCUMENTS

| | | | |
|---|---|---|---|
| 2017/0094657 A1 | 3/2017 | Yoon | |
| 2017/0188391 A1 | 6/2017 | Rajagopal et al. | |
| 2018/0227886 A1* | 8/2018 | Chou | H04B 7/0695 |
| 2018/0302889 A1 | 10/2018 | Guo et al. | |
| 2019/0052436 A1 | 2/2019 | Desai et al. | |
| 2019/0090107 A1 | 3/2019 | Kim et al. | |
| 2019/0124491 A1* | 4/2019 | Lim | H04W 52/146 |
| 2020/0137536 A1* | 4/2020 | Nguyen | H04L 27/2607 |
| 2021/0307060 A1* | 9/2021 | Agiwal | H04W 36/00837 |
| 2022/0007335 A1* | 1/2022 | Feng | H04W 72/0453 |
| 2022/0053496 A1* | 2/2022 | Yu | H04W 72/20 |

OTHER PUBLICATIONS

MediaTek Inc., DCI Aggregation in 2-stage DCI, 3GPP TSG RAN WG1 #88, Athens, Greece, Feb. 13-17, 2017, R1-1702723 (Year: 2017).*

Huawei, HiSilicon, Two-stage downlink control structure, 3GPP TSG-RAN WG1 Meeting #88, Athens, Greece, Feb. 13-17, 2017, R1-1701641 (Year: 2017).*

International Search Report and Written Opinion dated Dec. 25, 2019, issued in application No. PCT/CN2019/107658.

Bonjorn, N., et al.; "Enhanced 5G V2X Services using Sidelink Device-to-Device Communications;" Jul. 2018; pp. 1-8.

Qualcomm Incorporated; "2-Stage DCI;" 3GPP TSG-RAN WG1 NR AdHoc, R1-1700815; Jan. 2017; pp. 1-4.

Chinese language office action dated Feb. 22, 2021, issued in application No. TW 108134787.

* cited by examiner

TWO-STAGE DESIGN FOR NEW RADIO (NR) SIDELINK CONTROL INFORMATION (SCI)

CROSS-REFERENCE TO RELATED APPLICATIONS

This application claims the benefit of U.S. Provisional Application No. 62/738,017 filed on Sep. 28, 2018, the entirety of which is incorporated by reference herein.

TECHNICAL FIELD

Embodiments of the invention relate to wireless communications; more specifically, to wireless communications between two user equipment terminals (UEs).

BACKGROUND

5G New Radio (NR) is a telecommunication standard for mobile broadband communications. 5G NR is promulgated by the 3rd Generation Partnership Project (3GPP) to significantly improve on performance metrics such as latency, reliability, throughput, etc.

Vehicle-to-Everything (V2X) communication has the potential to modernize mobile communications for vehicles and significantly reduce the number of vehicular crashes and fatalities. Furthermore, V2X technologies can improve traffic management and the safety of autonomous vehicles. V2X technologies enable communications between vehicles as well as communications between a vehicle and other communication entities. NR V2X is built atop of 5G NR and is expected to support advanced V2X applications that require much more stringent Quality of Service (QoS) compared to applications supported by LTE-based V2X. For example, some of the NR V2X use cases require the end-to-end latency to be as low as 3 milliseconds with a reliability of 99.999%.

NR V2X supports not only broadcast in the physical layer, but also unicast and groupcast. By contrast, LTE-based V2X only supports broadcast in the physical layer. Thus, there is a need for an NR V2X system to support these different message types while maintaining substantially the same level of reliability and decoding complexity as LTE-based V2X.

SUMMARY

In one embodiment, a method performed by a receive (Rx) UE is provided for sidelink Vehicle-to-Everything (V2X) communication. The method comprises decoding, using blind detection, a first-stage Sidelink Control Information (SCI) in a received signal. The first-stage SCI contains control information for the Rx UE to locate time-and-frequency resources used by a transmit (Tx) UE. The time-and-frequency resources are used to transmit the first-stage SCI and a second-stage SCI via a Physical Sidelink Control Channel (PSCCH) and to transmit data via a Physical Sidelink Shared Channel (PSSCH) associated with the PSCCH. The method further comprises locating the second-stage SCI in the time-and-frequency resources based on the first-stage SCI. The second-stage SCI contains additional control information from the Tx UE to the Rx UE for the sidelink V2X communication. The method further comprises decoding the second-stage SCI using at least in part an identifier which identifies the Rx UE as a destination of the received signal.

In another embodiment, a method performed by a TxUE is provided for sidelink V2X communication. The method comprises encoding a first-stage SCI which contains control information for an Rx UE to locate time-and-frequency resources used by the Tx UE for the sidelink V2X communication. Encoding of the first-stage SCI does not use an identifier which identifies the Rx UE as a destination of the sidelink V2X communication. The method further comprises encoding a second-stage SCI using at least in part the identifier; transmitting the first-stage SCI and the second-stage SCI via a first part and a second part of a PSCCH, respectively; and transmitting data via a PSSCH associated with the PSCCH using a portion of the time-and-frequency resources. A location of the second-stage SCI in the time-and-frequency resources is determined based on the first-stage SCI.

In other embodiments, there is provided a UE operative to perform sidelink V2X communication. The UE comprises an antenna; a transceiver coupled to the antenna; one or more processors coupled to the transceiver; and memory coupled to the one or more processors. The one or more processors are operative to perform one or more of the aforementioned methods.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
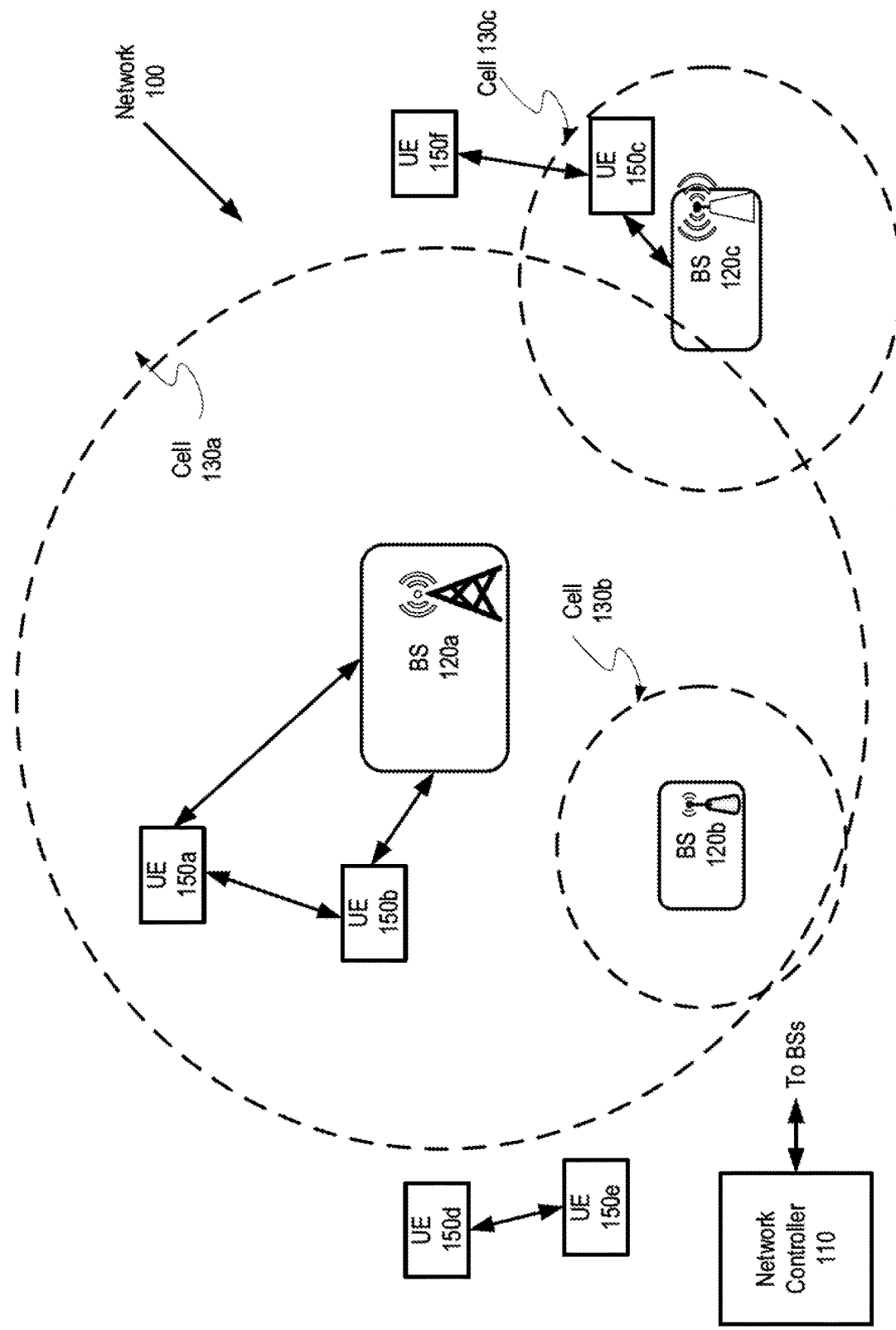
FIG. 1 is a diagram illustrating a network in which the embodiments of the present invention may be practiced.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

In a Vehicle-to-Everything (V2X) wireless communication system, a user equipment terminal (UE) may communicate directly with another UE via a sidelink channel, without using a base station as an intermediary. A sidelink channel may include a Physical Sidelink Control Channel (PSCCH) and a Physical Sidelink Shared Channel (PSSCH). The PSCCH is used to communicate control information (e.g., Sidelink Control Information (SCI)), and the PSSCH is used to communicate data. Embodiments of the methods and apparatuses described herein improve the performance of sidelink V2X communication systems by transmitting the SCI in two stages, such as a first-stage SCI and a second-stage SCI.

The SCI may be used by a receive (Rx) UE to identify the time-and-frequency resources acquired by or assigned to a transmit (Tx) LTE for sidelink V2X communication. A portion of the time-and-frequency resources may be used as the PSCCH and another portion may be used as the PSSCH associated with the PSCCH. To transmit control information and data to the Rx UE, the Tx LE may acquire time-and-frequency resources for a PSCCH and its associated PSSCH, and may reserve future time slots and subchannels for use as one or more future PSCCHs and their associated PSSCHs. In one embodiment, the PSCCH includes a first part which carries a first-stage SCI (also referred to as the "first SCI" or "SCI1") and a second part which carries a second-stage SCI (referred to as the "second SCI" or "SCI2").

In one embodiment, the first SCI may contain basic control information such as information for channel sensing. The basic control information, which includes time-and-frequency resource reservation, can be detected by all UEs in the communication range of the Tx UE. Some of these UEs may not be the intended destinations of the transmission. However, the information in the first SCI informs these UEs of the reserved resources, such that these UEs may autonomously select available resources (excluding the reserved resources) without the assistance of base stations. The second SCI can be decoded only by the intended destination UE or UEs of the transmission. The second SCI contains additional control information which may include at least one of: a modulation order, a code rate, redundancy information. Hybrid automatic repeat request (HARQ) information, reference signal information, a source identifier, a destination identifier, position information of the Tx UE, etc.

The two-stage design of the SCI improves decoding complexity, as all message types (including broadcast, unicast and groupcast) in a resource pool use the first SCI of the same size to carry basic control information. A resource pool is a pool of time-and-frequency resources shared by UEs in a predefined geographic area. Blind detection of fixed-size information is much less complex than blind detection of information of various possible sizes. The two-stage design also reduces signaling overhead with the same level of reliability for broadcast messages, as a broadcast message only uses the first SCI without the second SCI. A groupcast message, as well as a unicast message, may use both the first SCI and the second SCI to carry control information.

FIG. 1 is a diagram illustrating a network 100 in which the embodiments of the present invention may be practiced. The network 100 is a wireless network which may be a 5G network, an NR network, and/or the like. The network 100 may include a number of base stations (BSs), such as BSs 120a, 120b, and 120c, collectively referred to as the BSs 120. In some network environments such as an NR network, a BS may be known as a gNodeB, a gNB, and/or the like. In an alternative network environment, a BS may be known by other names. Each BS 120 provides communication coverage for a particular geographic area known as a cell, such as a cell 130a, 130b or 130c. The radius of a cell size may range from several kilometers to a few meters. A BS may communicate with one or more other BSs or network entities directly or indirectly via a wireless or wireline backhaul.

A network controller 110 may be coupled to a set of BSs such as the BSs 120 to coordinate, configure, and control these BSs 120. The network controller 110 may communicate with the BSs 120 via a backhaul.

The network 100 further includes a number of user equipment terminals (UEs), such as UEs 150a-150f, collectively referred to as the UEs 150. The UEs 150 may be anywhere in the network 100, and each UE 150 may be stationary or mobile. The UEs 150 may also be known by other names, such as a mobile station, a subscriber unit, and/or the like. Some of the UEs 150 may be implemented as part of a vehicle. Examples of the UEs 150 may include a cellular phone (e.g., a smartphone), a wireless communication device, a handheld device, a laptop computer, a cordless phone, a tablet, a gaming device, a wearable device, an entertainment device, a sensor, an infotainment device, Internet-of-Things (IoT) devices, or any device that can communicate via a wireless medium.

In some embodiments, two or more UEs 150 (e.g., UEs 150a and 150b; UEs 150d and 150e; UEs 150c and 150f) may communicate directly via sidelink V2X communication, without using any of the BSs 120 as an intermediary to communicate with one another. For example, two communicating UEs may be in the coverage area of one or more BSs (e.g., UEs 150a and 150b are in the coverage area of BS 120a); one of the two communicating UEs may be in the coverage area of a BS 120 (e.g., UE 150c is in the coverage area of BS 120c while UE 150f is not in the coverage area of any BSs); or neither of the two communicating UEs is in the coverage area of any BSs (e.g., both UEs 150d and 150e are outside the coverage area of BSs 120). These UEs 150 can be pre-configured to perform the sidelink V2X communication without the assistance from any BSs, access points, or the like.

To simplify the discussion, the methods and apparatuses are described within the context of NR. However, one of ordinary skill in the art would understand that the methods and apparatuses described herein are applicable generally to a variety of other wireless V2X communication systems.

Furthermore, it is noted that while the disclosed embodiments may be described herein using terminology commonly associated with 5G or NR wireless technologies, the present disclosure can be applied to other multi-access technologies and the telecommunication standards that employ these technologies.

Figure 2A:
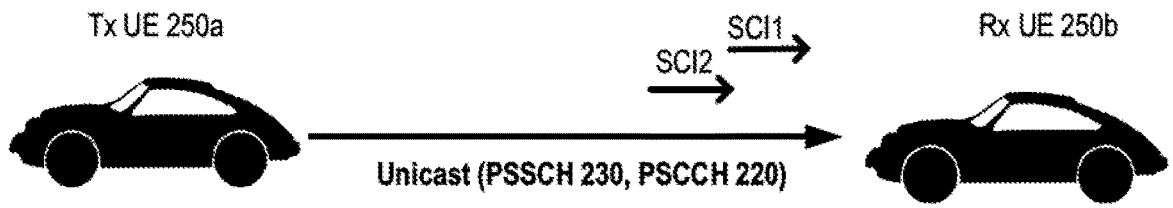
FIG. 2A, FIG. 2B and FIG. 2C are diagrams illustrating unicast, groupcast and broadcast, respectively, via sidelink V2X communication according to some embodiments.
Figure 2B:
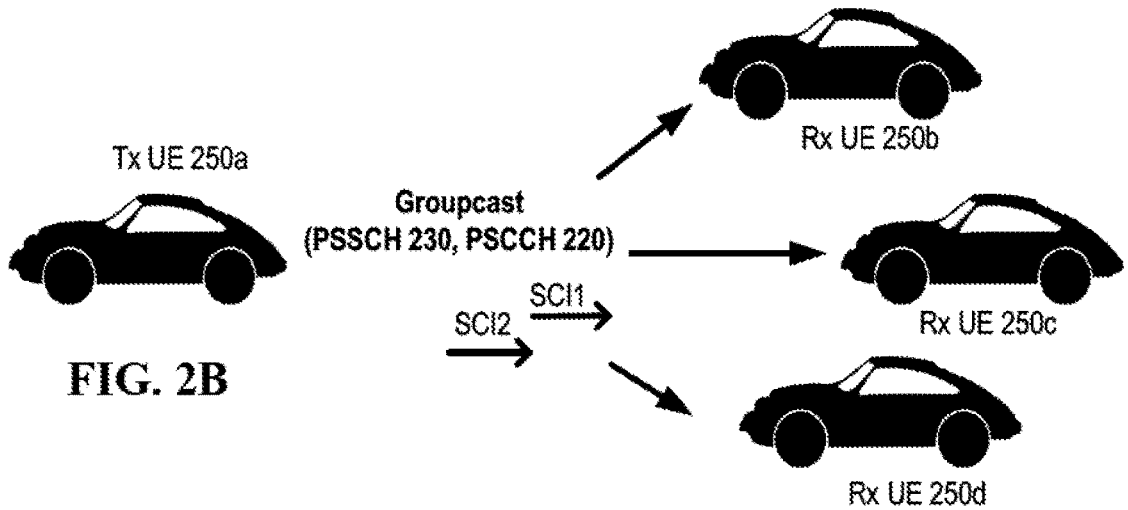
Figure 2C:
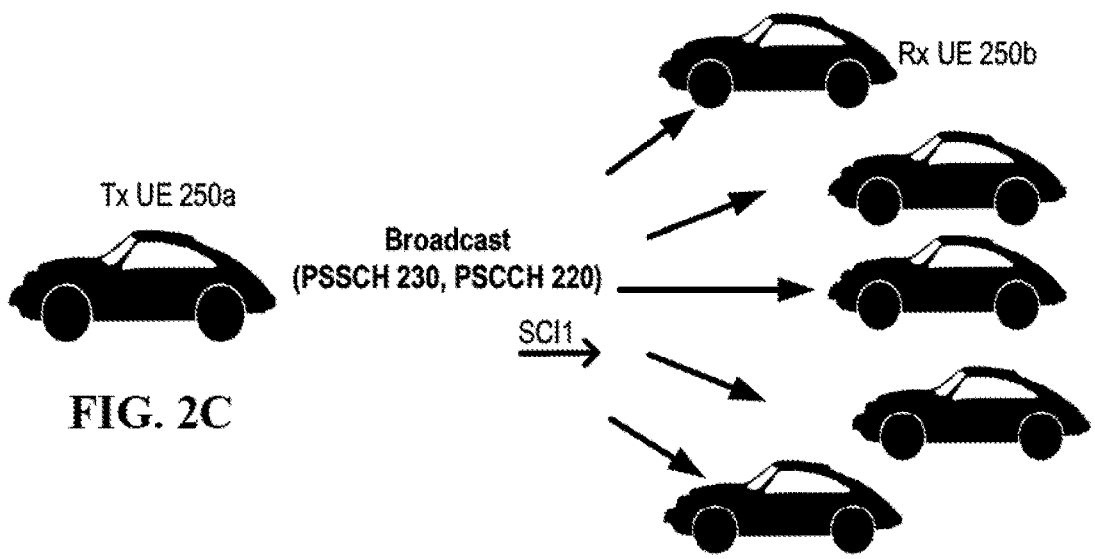

FIG. 2A, FIG. 2B and FIG. 2C are diagrams illustrating sidelink V2X communication between aTx UE 250a and an Rx UE 250b according to some embodiments. FIG. 2A is an example of unicast, FIG. 2B is an example of groupcast, and FIG. 2C is an example of broadcast. Tx UE 250a and Rx UE 250b may be examples of the UE 150a and the UE 150b, respectively, in FIG. 1. In one embodiment, Tx UE 250a and Rx UE 250b may be wireless devices located in corresponding vehicles. In another embodiment, Tx UE 250a and Rx UE 250b may be wireless devices located in corresponding entities connected to a wireless network, such as the network 100 in FIG. 1.

Before Tx UE 250a transmits data to Rx UE 250b, Tx UE 250a first obtains time resources (e.g., one or more time slots, or "slots") and frequency resources (e.g., one or more resource blocks (RBs) or subchannels) to establish a connection with Rx UE 250b. The time resources and the frequency resources may be collectively referred to as the time-and-frequency resources. In some cases, a BS (e.g., one of the BSs 120 in FIG. 1) may select available time-and-frequency resources for Tx UE 250a. In some cases, Tx UE 250a may select time-and-frequency resources based on information transmitted on the sidelink, where the information indicates, at least in part, resources that have been reserved by other UEs. Once Tx UE 250a acquires the necessary time-and-frequency resources, Tx UE 250a transmits control information in a PSCCH 220 and data in a PSSCH 230 to Rx UE 250b. Each PSCCH 220 has aPSSCH 230 associated therewith. Tx UE 250a may transmit control information and data to Rx UE 250b via multiple transmissions of (PSCCH 220, PSSCH 230).

In one embodiment, the SCI is transmitted in two stages as a first-stage SCI (denoted as SCI1) and a second-stage SCI (denoted as SCI2). SCI1 contains control information for Rx UE 250b to locate time-and-frequency resources used by Tx UE 250a. The time-and-frequency resources are used by Tx UE 250a to transmit a PSCCH and its associated PSSCH (where the PSCCH carries SCI1 and SCI2). SCI1 may further indicate the location(s) of reserved time-and-frequency resources to be used by Tx UE 250a in future transmissions to Rx UE 250b. The locations may be indicated by, for example, the start/end location of time slots and the start/end location of subchannels or RBs within the Tx UE's time-and-frequency resources.

The example of FIG. 2A shows that Tx UE 250a communicates with Rx UE 250b via unicast. With unicast, Rx UE 250b is identified by a UE-specific identifier (ID), which may be used by Tx UE 250a in a scrambling operation to generate error-checking bits (e.g., cyclic redundancy check (CRC) bits) of SCI2. The example of FIG. 2B shows that Tx UE 250a communicates with Rx UEs 250b, 250c and 250d via groupcast. Rx UEs 250b, 250c and 250d form a destination group identified by a group ID, which may be used by Tx UE 250a in a scrambling operation to generate error-checking bits (e.g., CRC bits) of SCI2. The example of FIG. 2C shows that Tx UE 250a broadcasts to Rx UE 250b and other UEs. The control information of a broadcast message may include SCI1 only, and no SCI2.

Figure 3:
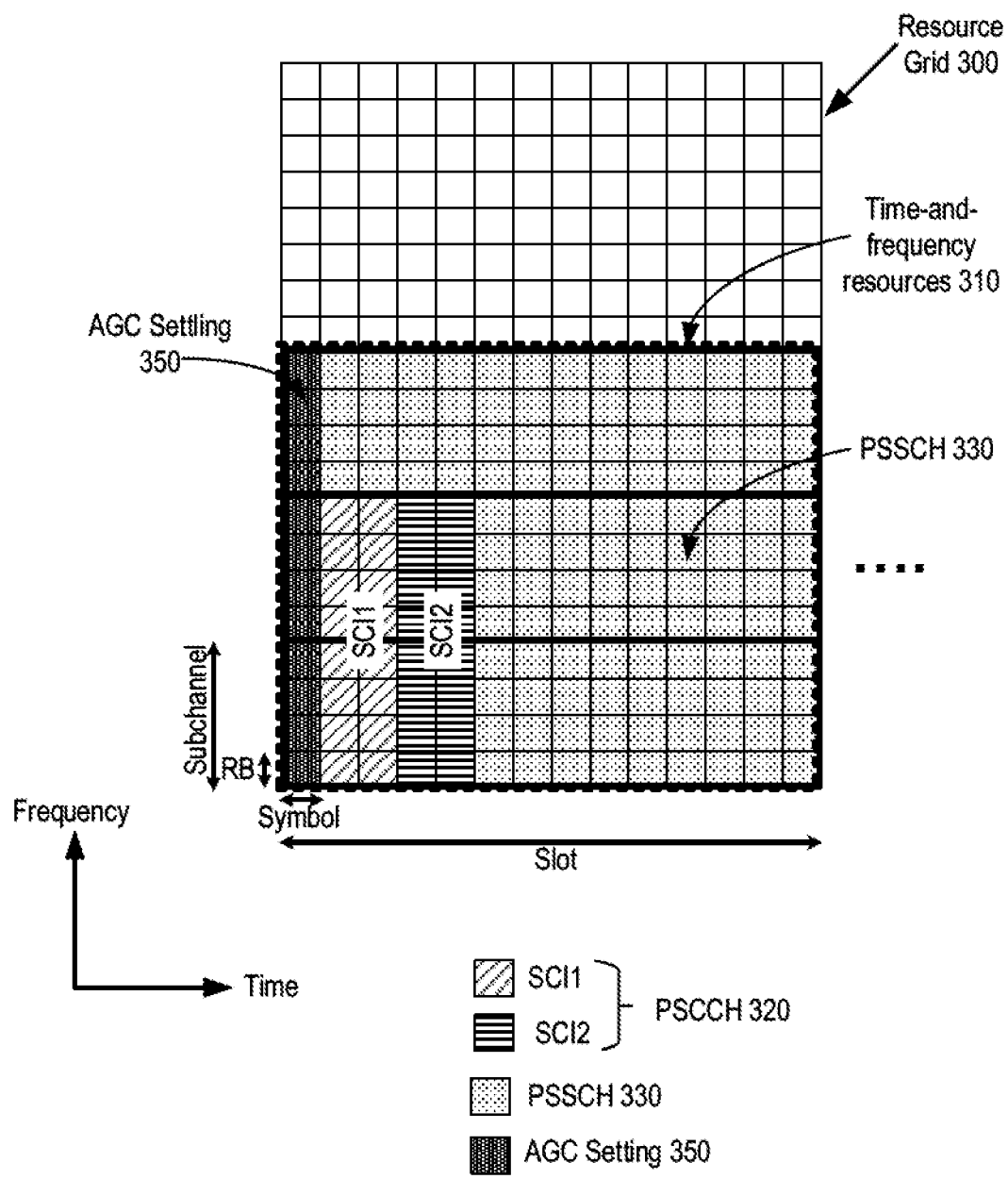
FIG. 3 is a diagram illustrating an example of time-and-frequency resources allocated to a UE for sidelink V2X communication according to one embodiment.

FIG. 3 is a diagram illustrating an example of the time-and-frequency resources allocated to a TxUE for sidelink V2X communication according to one embodiment. A resource grid 300 represents time-and-frequency resources with the time axis in the horizontal direction and the frequency axis in the vertical direction. Each square in the resource grid 300 represents a time resource of one symbol and a frequency resource of one resource block (RB).

Multiple time and frequency configurations are supported by NR. With respect to time resources, a frame may be 10 ms in length, and may be divided into ten subframes of 1 ms each. Each subframe may be further divided into multiple equal-length time slots (also referred to as "slots"), and the number of slots per subframe may be different in different configurations. Each slot may be further divided into multiple equal-length symbol durations (also referred to as symbols); e.g., 7 or 14 symbols. With respect to frequency resources. NR supports multiple different subcarrier bandwidths. Contiguous subcarriers are grouped into one RB. In one configuration, one RB contains 12 subcarriers, also referred to as resource elements (REs). Multiple RBs form one subchannel.

In some embodiments, each slot includes 14Orthogonal Frequency-Division Multiplexing (OFDM) symbols. Each subchannel is divided into multiple (e.g., 4) concurrent RBs, and each RB spans one symbol duration. An RB may contain multiple (e.g., 12) equal-spaced REs (i.e., subcarriers, which are not shown in FIG. 3). The resource grid 300 represents time-and-frequency resources for sidelink V2X communication.

A UE (e.g., Tx UE 250a in FIGS. 2A-2C) may acquire one or more subchannels and one or more slots for sidelink V2X communication. For example, a Tx UE may select, or be assigned, four slots and three subchannels for transmitting control information and data to are Rx UE. In FIG. 3, only the first time slot (i.e., the beginning slot) is shown. The slots and subchannels used by the Tx UE are herein referred to as the time-and-frequency resources used by the Tx LE for sidelink V2X transmission. The Tx LE uses the time-and-frequency resources to transmit control information via a PSCCH 320 (which carries SCI1 and SCI2) and a PSSCH 330. In FIG. 3, a beginning portion of such time-and-frequency resources is shown as time-and-frequency resources 310.

FIG. 3 shows that the first symbol of the beginning slot in the time-and-frequency resources 310 is used for automatic gain control (AGC) settling 350. In the AGC settling 350 symbol duration, signal power in an RB is measured for tuning the signal strength for the rest of the time slot. In one embodiment, the first symbol in a time slot (Which may be used by the PSCCH 320 or the PSSCH 330) is used for the AGC settling 350. In alternative embodiments, the AGC settling 350, SCI1, and SCI2 may occupy different numbers of symbols and/or different numbers of BBs than what is shown in FIG. 3. Furthermore, the AGC settling 350, SCI1, and SCI2 may be aligned or not aligned with subchannel boundaries.

FIG. 3 shows the PSCCH 320 as including SCI1 and SCI2, collectively referred to as the SCI. The SCI carried in the PSCCH 320 may be decoded by an Rx. LTE to identify the PSSCH 330 associated with the PSCCH 320.

In some embodiments, the location of SCI1 within the Tx UE's time-and-frequency resources may be predefined; e.g., the start location of SCI1 may be i symbols and j RBs away from the origin of the time-and-frequency resources 310, where i and j are non-negative integers determined by a system (e.g., the network controller 110 in FIG. 1) controlling the wireless network. The size of SCI1 may also be predefined with respect to the number of symbols and the number of RBs. In one embodiment, an Rx UE may identify the start location of SCI2 based on the start location of SCI1; for example, by adding an offset (such as m symbols and/or n RBs) to the start location of the SCI1. In one embodiment, an Rx UE may also identify the location of the PSSCH 330 based on the start location of SCI1. In one embodiment, an Rx UE may also identify the location of a HARQ feedback based on the start location of SCI1.

In some embodiments, SCI1 and SCI2 may use different numbers of symbols and/or different numbers of RBs, and may be encoded with different encoding schemes. Furthermore, SCI1 and SCI2 may use different error-correction or error-checking schemes.

The PSCCH and the PSSCH described herein may be multiplexed in time (i.e., Time-Division Multiplexing (TDM)), multiplexed in frequency (i.e., Frequency-Division Multiplexing (FDM)), or both in time and in frequency (i.e., both TDM and FDM). Furthermore, for message types that are non-broadcast (e.g., unicast or groupcast), the PSCCH may include a first part (e.g., PSCCH1) carrying SCI1 and a second part (e.g., PSCCH2) carrying SCI2. PSCCH1 and PSCCH2 may share a Tx UE's time-and-frequency resources with the PSSCH by FDM, TDM, or both FDM and TDM. PSCCH1 may be located at a predefined location L1 (with respect to an origin of the time-and-frequency resources used by Tx UE) and PSCCH2 may be located within Tx UE's time-and-frequency resources, at a location L2 which can be determined from the predefined location L1 of PSCCH1. PSCCH1 and PSCCH2 may be time-multiplexed (i.e., TDM), frequency-multiplexed (i.e., FDM), multiplexed in both time and frequency, or neither time-multiplexed nor frequency-multiplexed. Further details regarding the locations of the PSCCH (including its first and the second parts) and the PSSCH are provided below with reference to the examples shown in FIGS. 4A-4F.

FIGS. 4A-4F are diagrams illustrating, different time and frequency allocation schemes for a first-stage. SCI (SCI1), second-stage SCI (SCI2), and a PSSCH according to some embodiments. Each of FIGS. 4A-4F shows the time-and-frequency resources used by a Tx UE for communicating with an Rx UE in a transmission. A transmission is marked by an AGC settling 450 at the beginning and a guard period 460 at the end. The Tx UE may reserve time-and-frequency resources (which are not shown in the figures) for future transmissions to the Rx UE. No transmission occurs in the guard period 460. The guard period 460 may extend to subchannels used by other UEs.

Figure 4A:
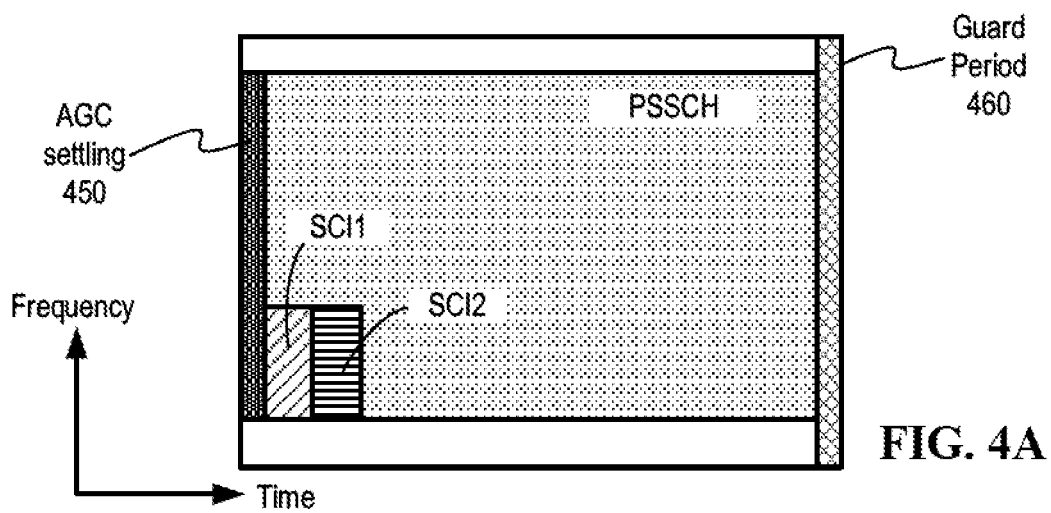
FIGS. 4A, 4B, 4C, 4D, 4E and 4F are diagrams illustrating different time-and-frequency allocation schemes for a first-stage SCI (SCI1), second-stage SCI (SCI2), and a PSSCH according to some embodiments.
Figure 4B:
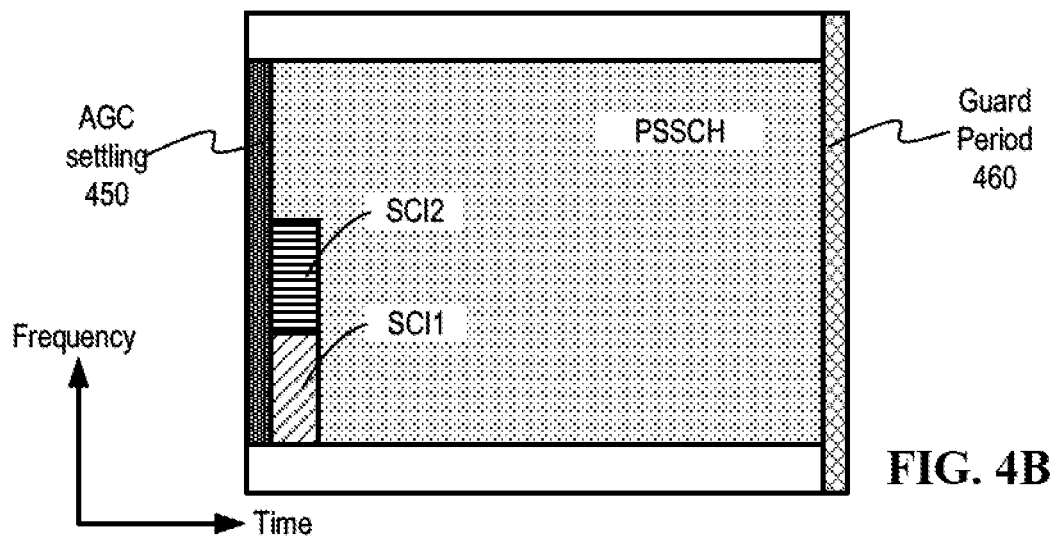
Figure 4C:
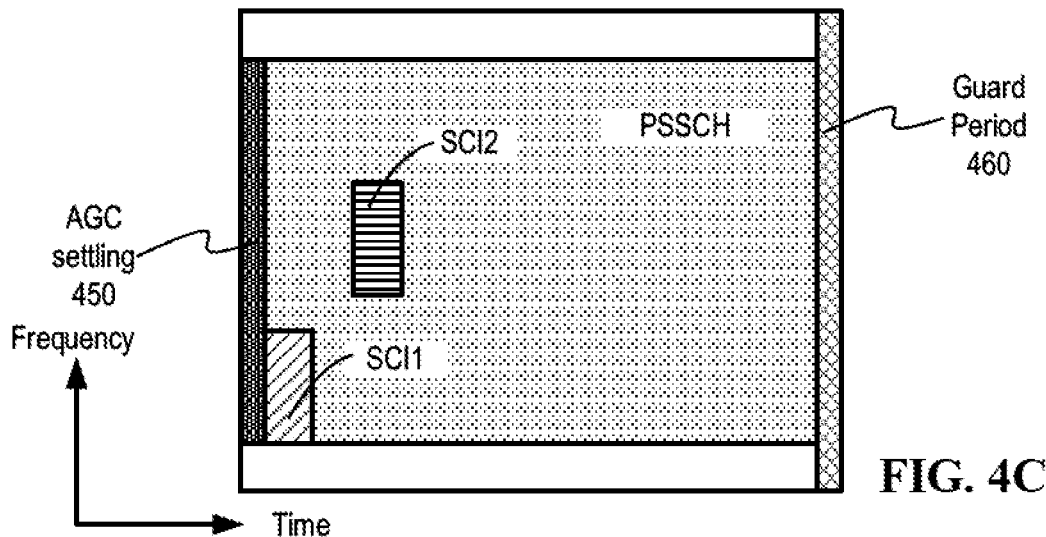

FIG. 4A illustrates an allocation scheme in which SCI1 and SCI2 are multiplexed in frequency; i.e., SCI1 and SCI2 share the same frequencies by TDM. FIG. 4B illustrates an allocation scheme in which SCI1 and SCI2 are multiplexed in time; i.e.; SCI1 and SCI2 share the same symbol duration by FDM. FIG. 4C illustrates an allocation scheme in which SCI1 and SCI2 are neither multiplexed in time nor in frequency; i.e., SCI1 and SCI2 are transmitted via different frequencies and different symbol periods.

In alternative embodiments, the location of SCI2 relative to SCI1 in the time-and-frequency resources used by a Tx UE may be different from FIGS. 4A-4C. For example, SCI1 and SCI2 may partially overlap in time and/or frequency. In some embodiments, SCI1 and SCI2 may occupy adjacent or non-adjacent symbols and/or RBs.

Figure 4D:
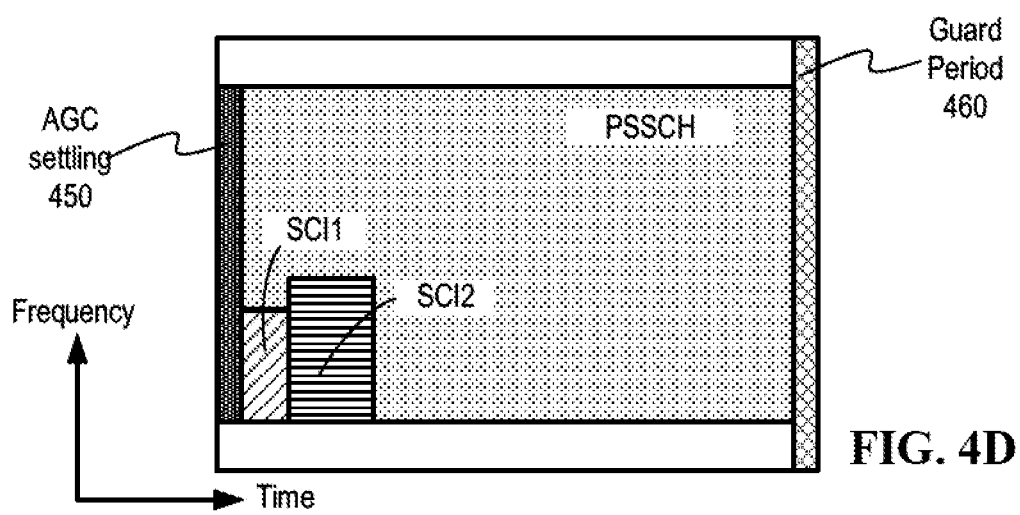
Figure 4E:
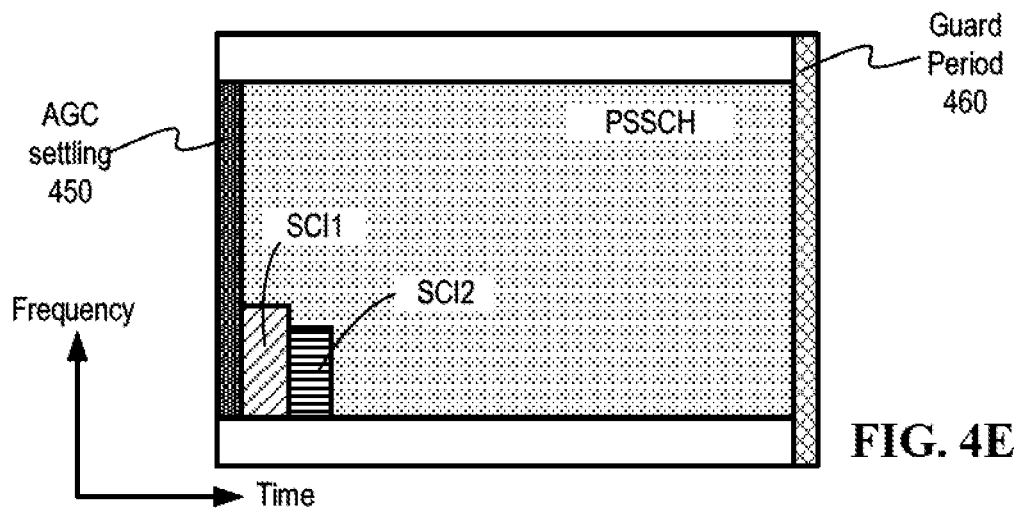

FIGS. 4D and 4E illustrate examples in which SCI1 and SCI2 may have different sizes. For examples, SCE may use more (FIG. 4D) or less (FIG. 4E) time-and-frequency resources than SCI1. The differences in the usage of time-and-frequency resources may be caused by SCI1 and SCI2 having different payload sizes (to carry a different amount of inform ad on), different code rates, etc. It is understood that the description in connection with FIGS. 4A-4C regarding the usage (e.g., adjacency and/or multiplexing) of time-and-frequency resources by SCI1 and SCI2 also applies to the examples of FIGS. 4D and 4E.

Figure 4F:
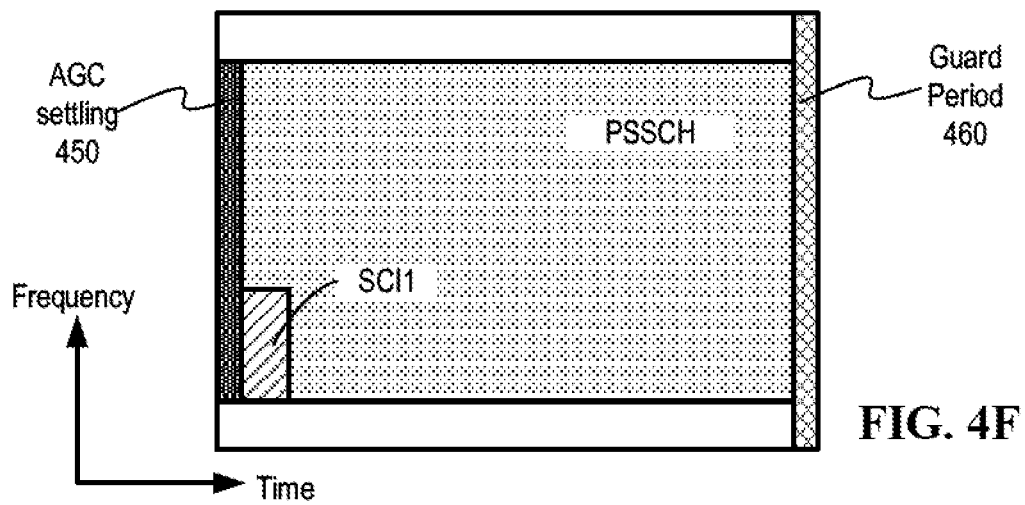

FIG. 4F illustrates an example in which the control information is carried by SCI1 only according to one embodiment. In some embodiments, SCI1 has a predefined payload size which is the same for broadcast, unicast and groupcast. The predefined payload size may be configured into all UEs in a wireless network. SCI2 carries additional control information needed for decoding unicast and groupcast messages. Therefore, when a Tx UE broadcasts a message to all UEs within its communication range, its PSCCH carries only SCI1 and no SCE. Having a known-sized SCI1 greatly reduces the complexity of blind detection performed by the Rx TIE. Additionally, allowing the broadcast to use SCI1 only, while groupcast and unicast to use both SCI1 and SCI2, reduces unnecessary redundancy in control information which may be incurred by enforcing a uniform-sized SCI across different message types.

It is noted that the time-and-frequency resources allocated to SCI1, SCI2 and the PSSCH are not limited to the aforementioned examples. For example, the number of symbols and the number of RBs occupied by SCI1, SCI2 and the PSSCH may be different in alternative embodiments.

Figure 5A:
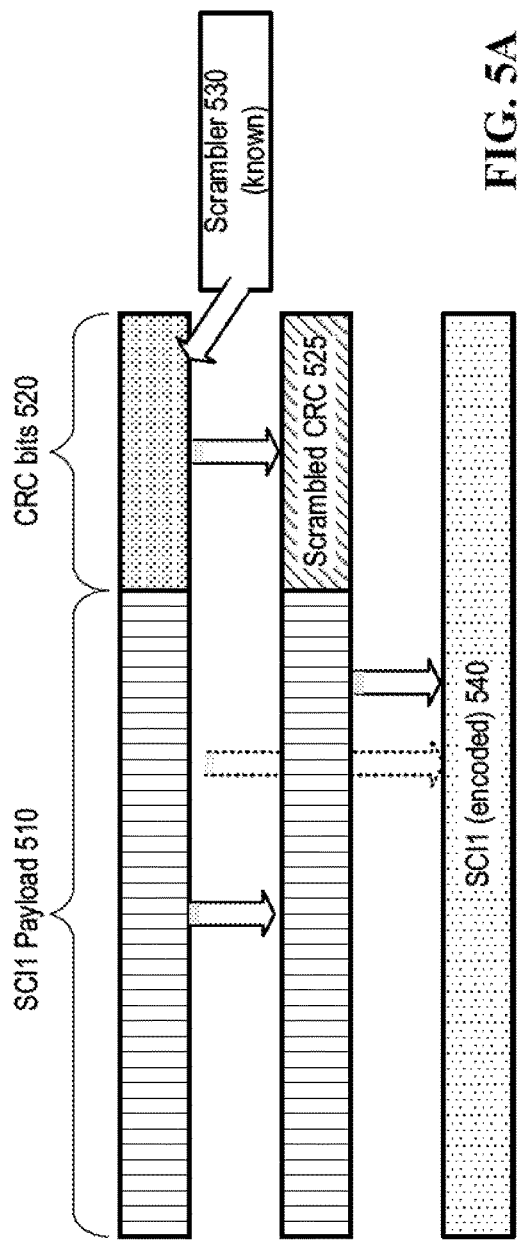
FIG. 5A is a diagram illustrating a scrambling operation performed on SCI1 according to some embodiments.

FIG. 5A illustrates a scrambling operation performed by a Tx UE on SCI1 according to some embodiments. The Tx UE first calculates a sequence of CRC bits 520 on an SCI1 payload 510. In one embodiment, a scrambler 530 is applied on the CRC bits 520 to produce scrambled CRC 525. The scrambler 530 is a data sequence (also referred to an identifier) which is known to all UEs in the same resource pool as the Tx UE. For example, all UEs in a resource pool of a wireless network may be provided, or configured, with the scrambler 530 such that these UEs can recover the CRC bits 520 and check for the correctness of received SCI1. The SCI1 payload 510 and the scrambled CRC 525 are encoded into encoded SCI1 540 for transmission. Alternatively as shown in the dotted arrow, the SCI1 payload 510 and the CRC bits 520 may be encoded for transmission without the scrambling operation.

In one embodiment, SCI1 540 may be decoded by any Rx UE in the communication range of the Tx UE by blind detection (also referred to as "blind decoding"). By blind detection, an Rx UE attempts to decode a set of candidate transmissions within a time constraint, to identify which transmission holds the control information for the transmission. The Rx UE performs blind detection because it does not know, among others, the location (with respect to time and frequency) of SCI1 540.

Figure 5B:
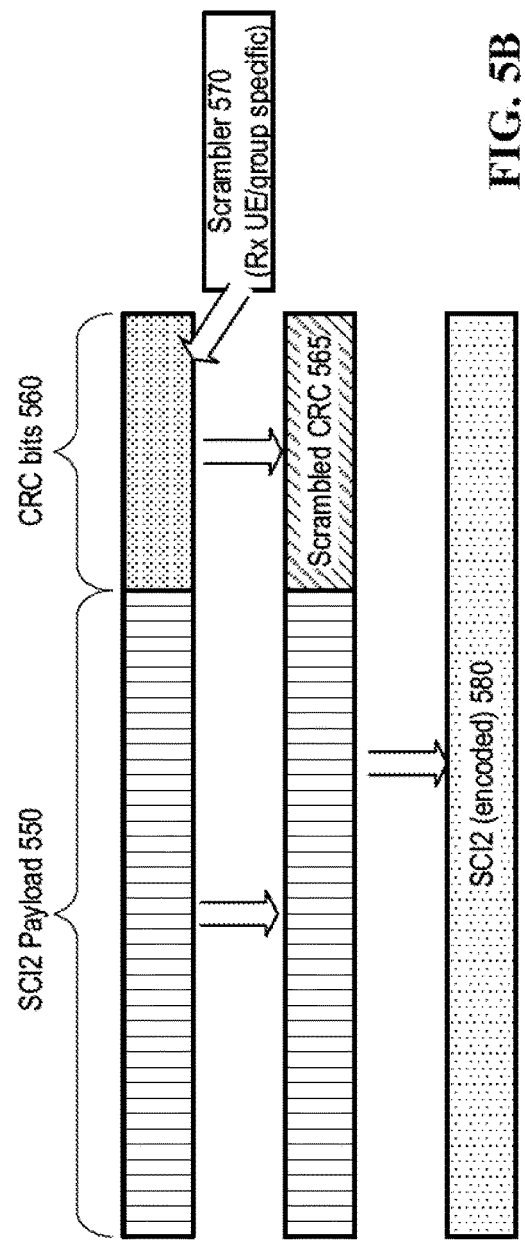
FIG. 5B is a diagram illustrating a scrambling operation performed on SCI2 according to one embodiment.

FIG. 5B illustrates a scrambling operation performed by a Tx UE on SCI2 according to one embodiment. The Tx UE first calculates a sequence of CRC bits 560 on an SCI2 payload 550. A scrambler 570 is applied on the CRC bits 560 to produce scrambled CRC 565. The scrambler 570 is a data sequence (also referred to an identifier) which is specific to an intended recipient or recipients; e.g., an Rx UE (for unicast) or a group of UEs (for groupcast). The identifier for unicast identifies the Rx UE and for groupcast identifies a group of UEs. Thus, only the UEs that are the intended recipients of a transmission may recover the CRC bits 560 and check for the correctness of received SCI2. The SCI2 payload 550 and the scrambled CRC 565 are encoded into encoded SCI2 580 before transmission.

SCI2 580 may be decoded by the UE(s) intended by the Tx US as recipient(s)/destination(s). For a unicast message, the intended destination is a single UE, while for a groupcast message, the intended destinations area group of destination UEs. A destination UE (i.e., an Rx UE) may determine the location (with respect to time and frequency) of SCI2 580 from the location of SCI1 540. Thus, the Rx UE may decode SCI2 580 without using blind detection.

Figure 6:
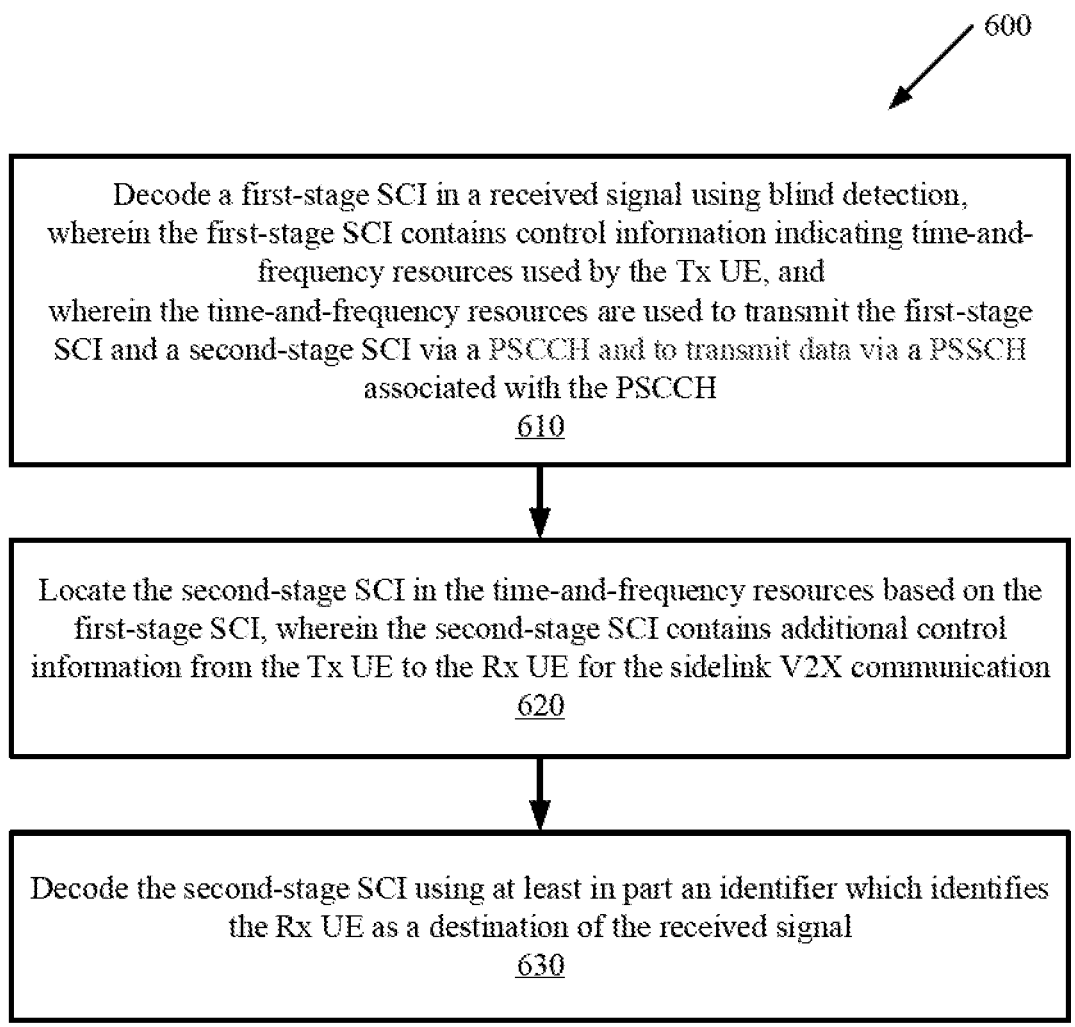
FIG. 6 illustrates a method for an Rx UE to receive sidelink V2X communication from a Tx UE according to one embodiment.

FIG. 6 illustrates a method 600 for an Rx UE to perform sidelink V2X transmission according to one embodiment. The method 600 starts at step 610 when the Rx UE decodes a first-stage SCI in a received signal using blind detection. The first-stage SCI contains control information for the Rx UE to locate time-and-frequency resources used by the Tx UE. The time-and-frequency resources are used to transmit the first-stage SCI and a second-stage SCI via a PSCCH and to transmit data via a PSSCH associated with the PSCCH. The Rx UE at step 620 locates the second-stage SCI in the time-and-frequency resources based on the first-stage SCI. The second-stage SCI contains additional control information from the Tx UE to the Rx UE for the sidelink V2X communication. The Rx UE at step 630 decodes the second-stage SCI using at least in part an identifier which identifies the Rx UE as a destination of the received signal.

Figure 7:
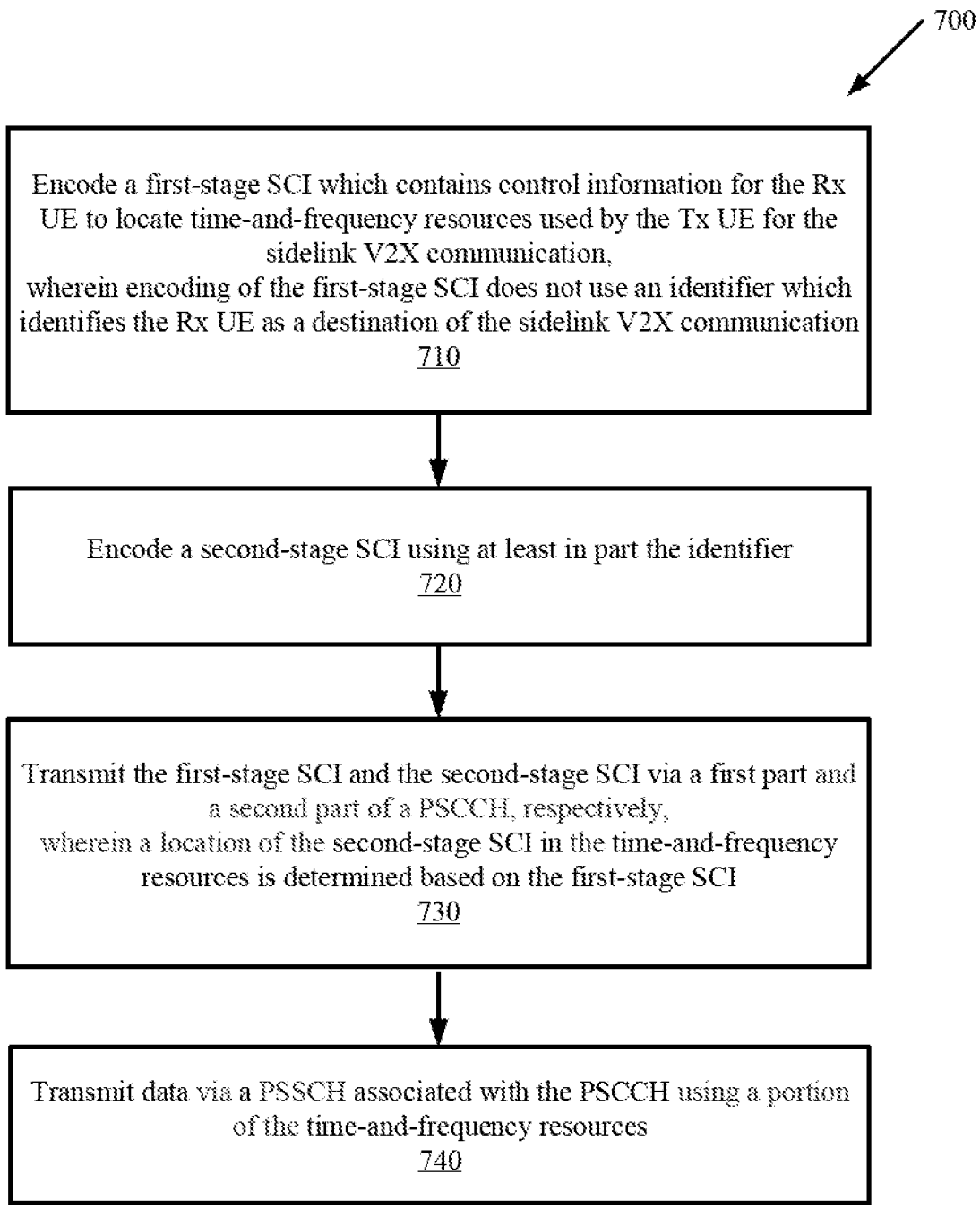
FIG. 7 illustrates a method for a Tx UE to transmit sidelink V2X communication to an Rx UE according to one embodiment.

FIG. 7 illustrates a method 700 for a Tx UE to transmit sidelink V2X communication to an Rx UE according to one embodiment. The method 700 starts at step 710 when the Tx UE encodes a first-stage SCI which contains control information for the Rx UE to locate time-and-frequency resources used by the Tx UE for the sidelink V2X communication. The encoding of the first-stage SCI does not use an identifier which identifies the Rx UE as a destination of the sidelink V2X communication. The Tx UE at step 720 encodes a second-stage SCI using at least in part the identifier. The Tx UE at step 730 transmits the first-stage SCI and the second-stage SCI via a first part and a second part of a PSCCH, respectively. A location of the second-stage SCI in the time-and-frequency resources is determined based on the first-stage SCI. The Tx UE at step 740 transmits data via a PSSCH associated with the PSCCH using a portion of the time-and-frequency resources.

Figure 8:
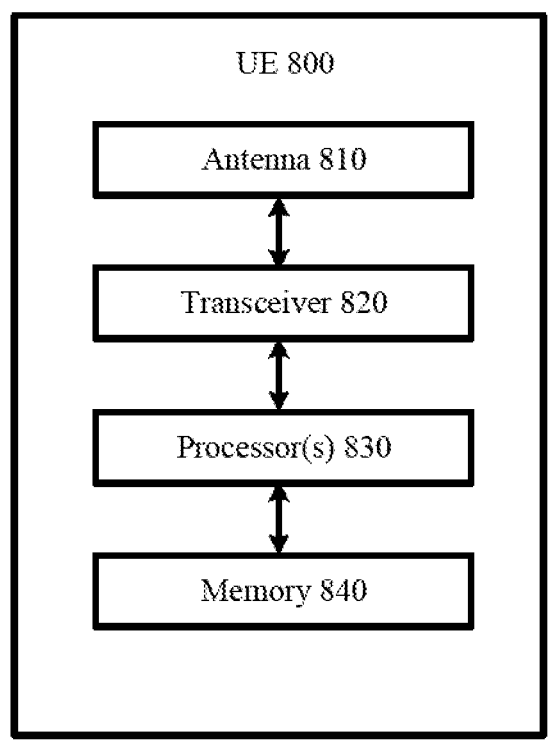
FIG. 8 is a block diagram illustrating elements of a UE operable to perform sidelink V2X communication according to one embodiment.

FIG. 8 is a block diagram illustrating elements of a UE 800 (also referred to as a wireless device, a wireless communication device, a wireless terminal, etc.) configured to provide sidelink V2Xcommunication according to one embodiment. As shown, the UE 800 may include an antenna 810, and a transceiver circuit (also referred to as a transceiver820) including a transmitter and a receiver configured to provide uplink and downlink radio communications with a base station of a radio access network, and to provide sidelinkV2Xcommunications directly with other wireless devices. The UE 800 may also include a processor circuit (which is shown as a processor 830 and which may include one or more processors) coupled to the transceiver 820. The processor(s) 830 may include one or more processor cores. The UE 800 may also include a memory circuit (also referred to as memory840) coupled to the processor 830. The memory 840 may include computer-readable program code that when executed by the processor 830 causes the processor 830 to perform operations according to embodiments disclosed herein, such as the method 600 in FIG. 6 and the method 700 in FIG. 7. The UE 800 may also include an interface (such as a user interface). The UE 800 may be incorporated in a vehicle or other wireless devices operable to perform sidelinkV2X communication. It is understood the embodiment of FIG. 8 is simplified for illustration purposes. Additional hardware components may be included.

Although the UE 800 is used in this disclosure as an example, it is understood that the methodology described herein is applicable to any computing and/or communication device capable of sidelink V2X communication.

The operations of the flow diagrams of FIGS. 6 and 7 have been described with reference to the exemplary embodiment of FIG. 8. However, it should be understood that the operations of the flow diagrams of FIGS. 6 and 7 can be performed by embodiments of the invention other than the embodiment of FIG. 8, and the embodiment of FIG. 8 can perform operations different than those discussed with reference to the flow diagrams. While the flow diagrams of FIGS. 6 and 7 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

The invention claimed is:

1. A method performed by a receive (Rx) UE for sidelink Vehicle-to-Everything (V2X) communication, comprising:
    decoding, using blind detection, a first-stage Sidelink Control Information (SCI) in a received signal, wherein the first-stage SCI contains control information for the Rx UE to locate time-and-frequency resources used by a transmit (Tx) UE, and wherein the time-and-frequency resources are used to transmit the first-stage SCI via a Physical Sidelink Control Channel (PSCCH) and to transmit a second-stage SCI and data via a Physical Sidelink Shared Channel (PSSCH) associated with the PSCCH; and
    locating the second-stage SCI in the time-and-frequency resources based on the first-stage SCI, wherein the second-stage SCI contains additional control information from the Tx UE to the Rx UE for the sidelink V2X communication,
    wherein the second-stage SCI contains the additional control information which includes a source identifier and a destination identifier.

2. The method of claim 1, wherein decoding the second-stage SCI further comprises:
    locating the second-stage SCI for the decoding when the received signal is a unicast or a groupcast from the Tx UE to the Rx UE.

3. The method of claim 1, wherein the first-stage SCI contains the control information for the Rx UE to locate reserved time-and-frequency resources for future data transmission from the Tx UE.

4. The method of claim 1, wherein the first-stage SCI has a predefined payload size which is same for broadcast, unicast and groupcast.

5. The method of claim 1, further comprising:
    locating the second-stage SCI within the time-and-frequency resources based on a start location of the first-stage SCI.

6. The method of claim 1, wherein the second-stage SCI contains the additional control information which further includes at least one of: a modulation order, a code rate, redundancy information, Hybrid automatic repeat request (HARQ) information, reference signal information, position information of the Tx UE.

7. The method of claim 1, wherein the first-stage SCI and the second-stage SCI are different with respect to one or more of: a payload size, a code rate, and a data scrambler for scrambling error-checking bits.

8. The method of claim 1, wherein the first-stage SCI includes first error-checking bits which are not scrambled or scrambled by a data sequence known to UEs in a same resource pool as the Tx UE, and the second-stage SCI includes error-checking bits which are scrambled by the identifier specific to the Rx UE or a destination group including the Rx UE.

9. The method of claim 1, wherein the PSCCH includes a first part carrying the first-stage SCI and a second part carrying the second-stage SCI, and wherein the first part and the second part of the PSCCH share the time-and-frequency resources with the PSSCH by one or more of: Frequency-Division Multiplexing and Time-Division Multiplexing.

10. A method performed by a transmit (Tx) UE for sidelink Vehicle-to-Everything (V2X) communication, comprising:
encoding a first-stage Sidelink Control Information (SCI) which contains control information for a receive (Rx) UE to locate time-and-frequency resources used by the Tx UE for the sidelink V2X communication, wherein encoding of the first-stage SCI does not use an identifier which identifies the Rx UE as a destination of the sidelink V2X communication;
encoding a second-stage SCI using at least in part the identifier;
transmitting the first-stage SCI via a first part and a second part of a Physical Sidelink Control Channel (PSCCH), respectively, wherein a location of the second-stage SCI in the time-and-frequency resources is determined based on the first-stage SCI; and
transmitting the second-stage SCI and data via a Physical Sidelink Shared Channel (PSSCH) associated with the PSCCH using a portion of the time-and-frequency resources,
wherein the second-stage SCI contains the additional control information which includes a source identifier and a destination identifier.

11. The method of claim 10, wherein encoding the second-stage SCI further comprises:
encoding the second-stage SCI when the sidelink V2X communication between the Tx UE and the Rx UE is a unicast or a groupcast.

12. The method of claim 10, wherein the first-stage SCI contains the control information for the Rx UE to locate reserved time-and-frequency resources for future data transmission from the Tx UE.

13. The method of claim 10, wherein the first-stage SCI has a predefined payload size which is same for broadcast, unicast and groupcast.

14. The method of claim 10, wherein a start location of the second-stage SCI within the time-and-frequency resources is determined from a start location of the first-stage SCI.

15. The method of claim 10, wherein the second-stage SCI contains the additional control information which includes at least one of: a modulation order, a code rate, redundancy information, Hybrid automatic repeat request (HARQ) information, reference signal information, position information of the Tx UE.

16. The method of claim 10, wherein the first-stage SCI and the second-stage SCI are different with respect to one or more of: a payload size, a code rate, and a data scrambler for scrambling error-checking bits.

17. The method of claim 10, wherein the first-stage SCI includes first error-checking bits which are not scrambled or scrambled by a data sequence known to UEs in a same resource pool as the Tx UE, and wherein the second-stage SCI includes second error-checking bits which are scrambled by the identifier specific to the Rx UE or a destination group including the Rx UE.

18. The method of claim 10, wherein the first part and the second part of the PSCCH share the time-and-frequency resources with the PSSCH by one or more of: Frequency-Division Multiplexing and Time-Division Multiplexing.

19. A receive (Rx) user equipment (UE) operative to perform sidelink vehicle-to-everything (V2X) communication, comprising:
an antenna;
a transceiver coupled to the antenna;
one or more processors coupled to the transceiver; and
memory coupled to the one or more processors, wherein the one or more processors are operative to perform the method according to claim 1.

20. A transmit (Tx) user equipment (UE) operative to perform sidelink vehicle-to-everything (V2X) communication, comprising:
an antenna;
a transceiver coupled to the antenna;
one or more processors coupled to the transceiver; and
memory coupled to the one or more processors, wherein the one or more processors are operative to perform the method according to claim 10.

* * * * *